(12) United States Patent
Morishige

(10) Patent No.: US 8,979,688 B2
(45) Date of Patent: Mar. 17, 2015

(54) CUSHIONING STRUCTURE FOR A SPROCKET

(75) Inventor: Kouji Morishige, Nabari (JP)

(73) Assignee: BorgWarner, Inc., Auburn Hills, MI (US)

( * ) Notice: Subject to any disclaimer, the term of this patent is extended or adjusted under 35 U.S.C. 154(b) by 314 days.

(21) Appl. No.: 13/696,716

(22) PCT Filed: May 17, 2011

(86) PCT No.: PCT/US2011/036748
§ 371 (c)(1),
(2), (4) Date: Nov. 7, 2012

(87) PCT Pub. No.: WO2011/146434
PCT Pub. Date: Nov. 24, 2011

(65) Prior Publication Data
US 2013/0059689 A1     Mar. 7, 2013

(30) Foreign Application Priority Data
May 21, 2010    (JP) .................... 2010-117111

(51) Int. Cl.
*F16H 55/14* (2006.01)
*F16H 55/30* (2006.01)

(52) U.S. Cl.
CPC .......... *F16H 55/30* (2013.01); *F16H 2055/306* (2013.01)
USPC ............................................ 474/152

(58) Field of Classification Search
CPC ..................... F16H 55/30; F16H 2055/306
USPC ........................... 474/152, 156, 161
See application file for complete search history.

(56) References Cited

U.S. PATENT DOCUMENTS

| | | | | |
|---|---|---|---|---|
| 4,348,199 A * | 9/1982 | Oonuma et al. | ............... | 474/156 |
| 4,752,281 A | 6/1988 | Lammers | | |
| 2004/0204274 A1* | 10/2004 | Young | .............. | 474/156 |
| 2005/0170925 A1* | 8/2005 | Hamilton | ...................... | 474/161 |
| 2006/0073927 A1* | 4/2006 | Haesloop | ....................... | 474/161 |
| 2007/0293361 A1* | 12/2007 | Young | ........................... | 474/152 |
| 2009/0093329 A1 | 4/2009 | Markley et al. | | |
| 2009/0118047 A1 | 5/2009 | Haesloop | | |

FOREIGN PATENT DOCUMENTS

| | | | |
|---|---|---|---|
| JP | | 52-163661 U | 12/1977 |
| JP | | 57-137856 U | 8/1982 |
| KR | 10-2009-0065369 A | | 6/2009 |

* cited by examiner

*Primary Examiner* — William E Dondero
*Assistant Examiner* — Robert T Reese
(74) *Attorney, Agent, or Firm* — Helmholdt Law PLC; Thomas D. Helmholdt

(57) ABSTRACT

ISSUE To reduce operating noise and further improve durability in a cushioning structure for a sprocket used in a roller chain or bush chain. MEANS OF RESOLUTION Annular first and second cushion rings 2, 3 are provided in such a way as to be able to slide against each other around grooves 10a in a sprocket 1. The first cushion ring 2 consists of a single wire and has a wave-like shape comprising a plurality of projections 2a. The second cushion ring 3 consists of a single wire and has a circular shape running around the outer circumference of the sprocket 1. When a roller chain 5 meshes with the sprocket, the rollers 50 make contact with the second cushion ring 3 causing the second cushion ring 3 to elastically deform, then causing the first cushion ring 2 to elastically deform. At this point, the first and second cushion rings 2, 3 slide against each other. As a result, the impact noise of the rollers 50 and the sprocket teeth 10 is effectively reduced.

14 Claims, 13 Drawing Sheets

CUSHIONING STRUCTURE FOR A SPROCKET

TECHNICAL FIELD

The present invention relates to a cushioning structure for a sprocket used in a roller chain or a bush chain, and more specifically relates to an improved structure therefor which employs a cushion ring.

PRIOR ART

When a roller chain or a bush chain meshes with a sprocket, the rollers of the roller chain or the bushes of the bush chain engage with the tooth surface of the sprocket. When this happens, noise is produced by the impact of the rollers or bushes with the sprocket tooth surface.

Various improvements in reducing this noise have been made hitherto.

As shown in FIG. 1 of the system disclosed in JP52-163661U, for example, cushioning rubber is provided in a polygonal shape in a groove formed all the way around the tooth surface of the sprocket. When the sprocket meshes with the roller chain, the rollers of the roller chain make contact with the cushioning rubber, at which point the rollers engage with the bottom of the sprocket teeth while supported by the elasticity of the cushioning rubber. As a result, the noise of the impact of the rollers and the sprocket teeth is reduced.

Furthermore, as shown in FIGS. 1 through 4 of the system disclosed in JP57-137856U, an elastic ring (O-ring) is fitted in an annular shape in a circumferential groove formed at the bottom part of the sprocket teeth. When the chain engages with the sprocket, the pins of the chain make contact with the elastic ring, at which point the pins engage with the bottom of the sprocket teeth while elastically supported by the elastic ring. As a result, the noise of the impact of the pins and the sprocket teeth is reduced.

SUMMARY OF THE INVENTION

Issues to be Resolved by the Invention

Both of the systems in the publications mentioned above envision reducing the meshing noise by cushioning the metal roller or pin with an elastic element made of rubber.

However, in these cases, the only action for absorbing and reducing the impact is produced by the elastic deformation of the elastic element, which therefore becomes worn during prolonged operation, and as a result there is a risk of a reduction in the ability of the elastic element to absorb impacts. This means that durability is a problem with conventional structures.

The present invention has been devised in view of the conventional situation described above, and the issue to be resolved by the present invention lies in providing a cushioning structure for a sprocket in a roller chain or bush chain, which makes it possible to reduce operating noise and moreover to further improve durability.

Means of Resolving the Issues

The invention of claim 1 constitutes a cushioning structure for a sprocket used in a roller chain or a bush chain, wherein the sprocket comprises a plurality of teeth arranged around the outer circumference thereof, and grooves which are formed in the circumferential direction at the tooth surface of each tooth. The cushioning structure comprises first and second annular cushion rings respectively provided along the grooves. The first cushion ring consists of a single wire and has a wave-like shape comprising a plurality of projections arranged at intervals. The second cushion ring consists of a single wire and has a circular shape running around the outer circumference of the sprocket. The first and second cushion rings are provided in such a way as to be able to slide against each other.

According to the invention of claim 1, when rollers of the roller chain or bushes of the bush chain mesh with the sprocket teeth, the rollers or the bushes make contact with the first or second cushion ring, at which point the first cushion ring and then the second cushion ring elastically deforms, or the second cushion ring and then the first cushion ring elastically deforms, and as a result the first and second cushion rings slide against each other.

In this case, when the sprocket meshes with the chain, the first and second cushion rings not only undergo elastic deformation, the first and second cushion rings also slide against each other, and therefore it is possible to effectively reduce the impact noise produced by the impact of the rollers or bushes with the sprocket teeth, and as a result the operating noise can be reduced.

Moreover, in this case, the first and second cushion rings are both made of wire, and therefore they are not easily worn by either the impact from the rollers or bushes, or by the sliding between the cushion rings, and as a result the operating durability can be further improved.

In the invention of claim 2, which is in accordance with claim 1, the starting end and the terminal end of the first cushion ring are joined.

In this case, when the roller chain or bush chain meshes with the sprocket, the projections of the first cushion ring elastically deform, whereby the impact noise can be reduced.

In the invention of claim 3, which is in accordance with claim 1, the starting end and the terminal end of the first cushion ring are not joined and overlap in such a way as to be able to slide against each other.

In this case, when the roller chain or bush chain meshes with the sprocket, the projections of the first cushion ring not only undergo elastic deformation, but the starting end and terminal end of the first cushion ring also slide against each other, and therefore it is possible to effectively reduce the noise.

In the invention of claim 4, which is in accordance with claim 1, the starting end and the terminal end of the second cushion ring are joined.

In this case, when the roller chain or bush chain meshes with the sprocket, the projections of the second cushion ring elastically deform, whereby the impact noise can be reduced.

In the invention of claim 5, which is in accordance with claim 1, the starting end and the terminal end of the second cushion ring are not joined and overlap in such a way as to be able to slide against each other.

In this case, when the roller chain or bush chain meshes with the sprocket, the projections of the second cushion ring not only undergo elastic deformation, but the starting end and terminal end of the second cushion ring also slide against each other, and therefore it is possible to effectively reduce the noise.

In the invention of claim 6, which is in accordance with claim 1 the projections of the first cushion ring are provided correspondingly with the teeth of the sprocket.

In this case, when the rollers of the roller chain or the bushes of the bush chain mesh with any of the sprocket teeth, a corresponding projection on the first cushion ring will also elastically deform, and therefore the impact noise can be effectively reduced.

In the invention of claim 7, which is in accordance with claim 1, the first cushion ring is provided at the inner side of the second cushion ring.

In this case, when the rollers of the roller chain or the bushes of the bush chain mesh with the sprocket teeth, the rollers or bushes first of all make contact with the second cushion ring, causing the second cushion ring to elastically deform and then causing the first cushion ring to elastically deform. Furthermore, at this point, the second cushion ring slides over the first cushion ring. As a result, it is possible to effectively reduce the impact noise produced by the impact of the rollers or bushes with the sprocket teeth, and the operating noise can be reduced.

In the invention of claim 8, which is in accordance with claim 7, the second cushion ring is circumscribed about the projections of the first cushion ring.

In this case, when the rollers of the roller chain or the bushes of the bush chain mesh with the sprocket teeth, the rollers or bushes first of all make contact with the second cushion ring, causing the second cushion ring to elastically deform and then causing the projections of the first cushion ring to elastically deform. Furthermore, at this point, the second cushion ring slides over the projections of the first cushion ring. As a result, it is possible to effectively reduce the impact noise produced by the impact of the rollers or bushes with the sprocket teeth, and the operating noise can be reduced.

In the invention of claim 9, which is in accordance with claim 7, the inner diameter of the second cushion ring is greater than the outer diameter of the first cushion ring, and the center of the second cushion ring is offset from the center of the first cushion ring.

In this case, the inner diameter of the second cushion ring is greater than the outer diameter of the first cushion ring, and the second cushion ring is eccentric with respect to the first cushion ring, which means that when the rollers of the roller chain or bushes of the bush chain mesh with the sprocket and the second cushion ring elastically deforms, the contacted portions of the second cushion ring which are contacted by the rollers of the roller chain or bushes of the bush chain undergo localized elastic deformation, while at the same time the whole of the second cushion ring elastically deforms in an elliptical shape. This synergistic effect not only makes it possible to effectively reduce the impact noise, but also to reduce localized wear on the second cushion ring and improve the durability.

In the invention of claim 10, which is in accordance with claim 1, the first cushion ring is provided at the outer side of the second cushion ring.

In this case, when the rollers of the roller chain or the bushes of the bush chain mesh with the sprocket teeth, the rollers or bushes first of all make contact with the first cushion ring, causing the first cushion ring to elastically deform and then causing the second cushion ring to elastically deform. Furthermore, at this point, the first cushion ring slides over the second cushion ring. As a result, it is possible to effectively reduce the impact noise produced by the impact of the rollers or bushes with the sprocket teeth, and the operating noise can be reduced.

In the invention of claim 11, which is in accordance with claim 10, the second cushion ring is inscribed within the depressions formed between the adjacent projections of the first cushion ring.

In this case, when the rollers of the roller chain or the bushes of the bush chain mesh with the sprocket teeth, the rollers or bushes first of all make contact with the first cushion ring, causing the first cushion ring to elastically deform and then causing the second cushion ring to elastically deform. Furthermore, at this point, the depressions in the first cushion ring slide over the second cushion ring. As a result, it is possible to effectively reduce the impact noise produced by the impact of the rollers or bushes with the sprocket teeth, and the operating noise can be reduced.

In the invention of claim 12, which is in accordance with claim 10, the inner diameter of the first cushion ring is greater than the outer diameter of the second cushion ring, and the center of the first cushion ring is offset from the center of the second cushion ring.

In this case, the inner diameter of the first cushion ring is greater than the outer diameter of the second cushion ring, and the first cushion ring is eccentric with respect to the second cushion ring, which means that when the rollers of the roller chain or bushes of the bush chain mesh with the sprocket and the first cushion ring elastically deforms, the contacted portions of the first cushion ring which are contacted by the rollers of the roller chain or bushes of the bush chain undergo localized elastic deformation, while at the same time the whole of the first cushion ring elastically deforms in an elliptical shape. This synergistic effect not only makes it possible to effectively reduce the impact noise, but also to reduce localized wear on the first cushion ring and improve the durability.

In the invention of claim 13, which is in accordance with claim 1, the first and second cushion rings are made of steel.

In this case it is not only possible to prevent deterioration of the first and second cushion rings which occurs with repeated deformation of the first and second cushion rings, but also to reduce the wear on the first and second cushion rings which occurs with sliding of the first and second cushion rings, so the durability can be further improved.

The invention of claim 14 constitutes a cushioning structure for a sprocket used in a roller chain or a bush chain, wherein the sprocket comprises a plurality of teeth arranged around the outer circumference thereof, and grooves which are formed in the circumferential direction at the tooth surface of each tooth. The cushioning structure comprises first and second annular cushion rings respectively provided along the grooves. The first cushion ring consists of a single wire and has a wave-like shape comprising a plurality of projections arranged at intervals. The second cushion ring consists of a single wire and has a circular shape running around the outer circumference of the sprocket. The first and second cushion rings are provided in such a way as to be able to slide against each other.

In this case, when rollers of the roller chain or bushes of the bush chain mesh with the sprocket teeth, the rollers or the bushes make contact with the first or second cushion ring, at which point the first cushion ring and then the second cushion ring elastically deforms, or the second cushion ring and then the first cushion ring elastically deforms, and the first and second cushion rings slide against each other. As a result, the impact noise of the roller or bushes and the sprocket teeth is reduced.

Advantage of the Invention

As described above, the cushioning structure according to the present invention is provided with the first and second cushion rings which are made of steel and can slide against each other, and therefore the roller chain or bush chain meshes with the sprocket, the first and second cushion rings not only undergo elastic deformation, the first and second cushion rings also slide against each other. As a result, it is possible to effectively reduce the impact noise produced by the impact of the rollers or bushes with the sprocket teeth, to reduce the operating noise, and also to further improve the durability.

MODE OF EMBODIMENT OF THE INVENTION

Exemplary embodiments of the present invention will be described below in conjunction with the appended figures.

First Exemplary Embodiment

FIGS. 1 through 7 illustrate the cushioning structure according to the first exemplary embodiment of the present invention; in the figures, the same reference symbols denote like or equivalent elements.

Figure 1:
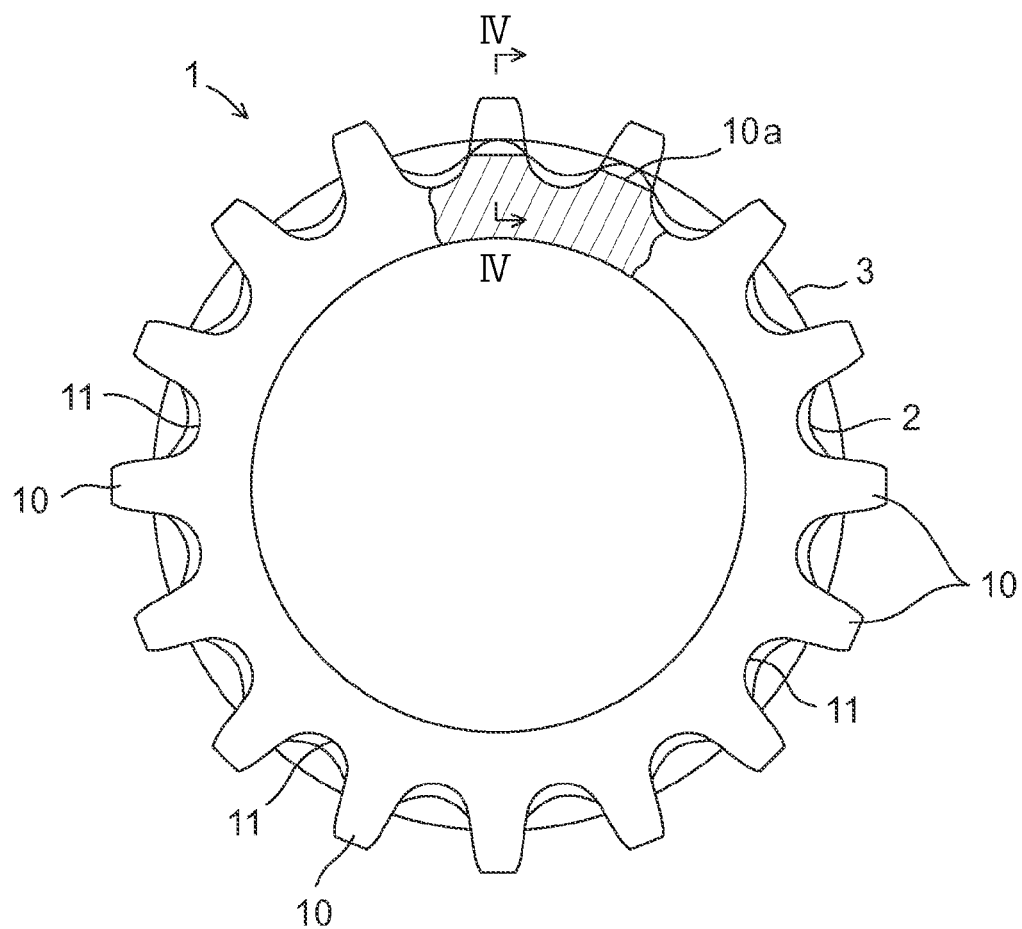
FIG. 1 A partial cutaway front view of a sprocket provided with the cushioning structure according to a first exemplary embodiment of the present invention.

As shown in FIG. 1, a sprocket 1 for a roller chain or bush chain comprises a plurality of teeth 10 arranged around the outer circumference thereof. Arcuate tooth bottom parts 11 with which the rollers of the roller chain or bushes of the bush chain engage are formed between the adjacent teeth 10 in the circumferential direction.

Figure 4:
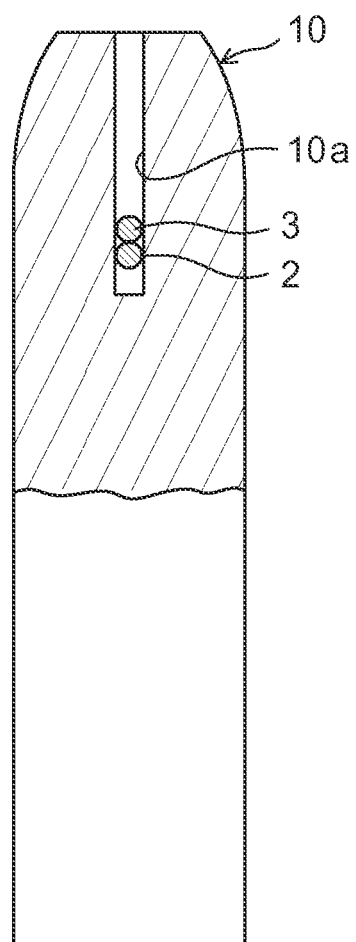
FIG. 4 A view in cross section along the line IV-IV in FIG. 1.
Figure 5:
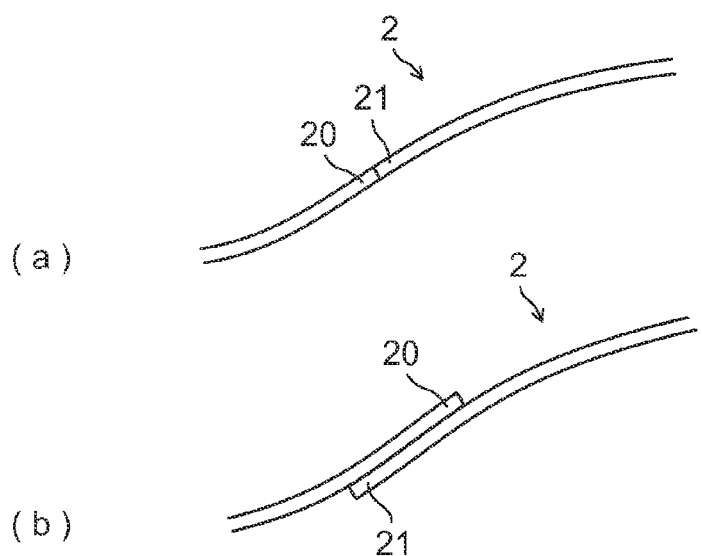
FIG. 5 An enlarged view of the starting end and terminal end portions of the first cushion ring forming part of the above cushioning structure (FIG. 1), where (a) shows the situation when the starting end and the terminal end are joined by butt welding, and (b) shows the situation when the starting and the terminal end portions are provided in an overlapping state in such a way as to be able to slide against each other.
Figure 6:
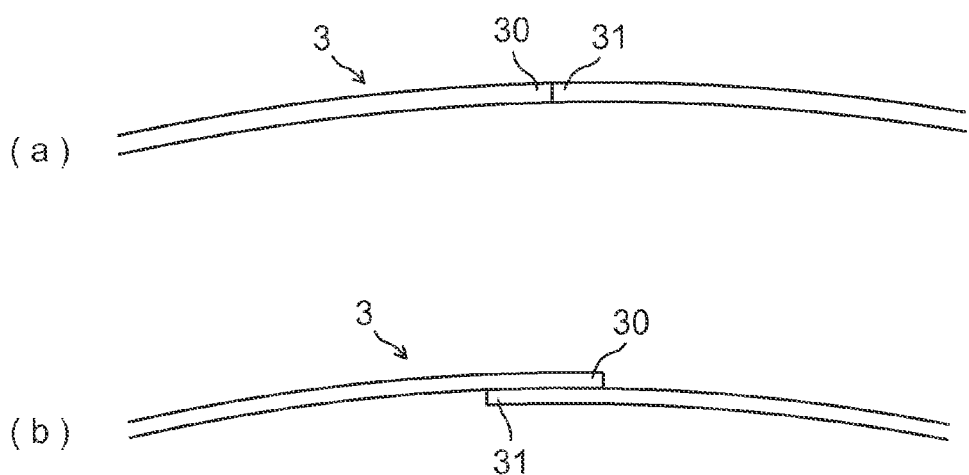
FIG. 6 An enlarged view of the starting end and terminal end portions of the second cushion ring forming part of the above cushioning structure (FIG. 1), where (a) shows the situation when the starting end and the terminal end are joined by butt welding, and (b) shows the situation when the starting end and the terminal end portions are provided in an overlapping state in such a way as to be able to slide against each other.

Grooves 10a are formed in the circumferential direction at the tooth surface of each tooth 10. As shown in FIG. 4 which is a view in cross section along the line IV-IV in FIG. 1, the grooves 10a are slit-like grooves cut into the tooth parts from the tooth tip toward the center of the sprocket substantially in the center in the tooth thickness direction (the left-right direction in FIG. 4).

A first cushion ring 2 and a second cushion ring 3 which form the cushioning structure according to the first exemplary embodiment of the present invention are provided within the grooves 10a. The first cushion ring 2 is provided at the inner side (i.e. the inner circumferential side) of the second cushion ring 3. The first and second cushion rings 2, 3 are both annular members which are provided along the grooves 10a (see FIG. 3).

Figure 2:
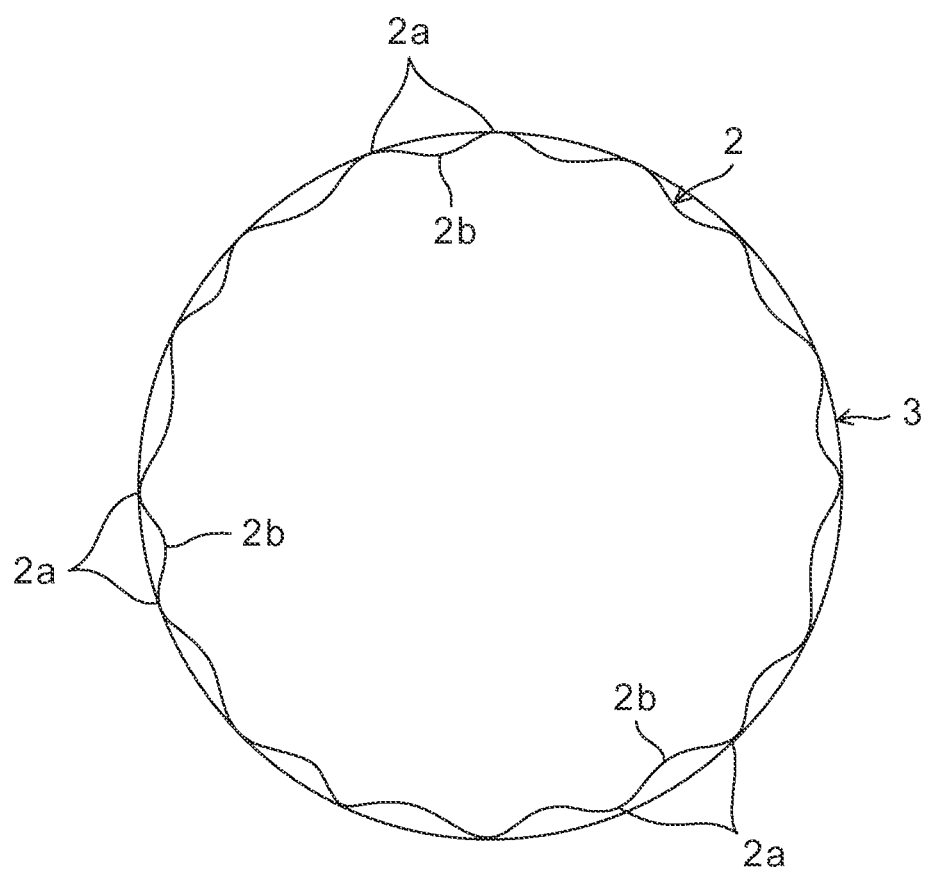
FIG. 2 A front view of the above cushioning structure (FIG. 1).
Figure 3:
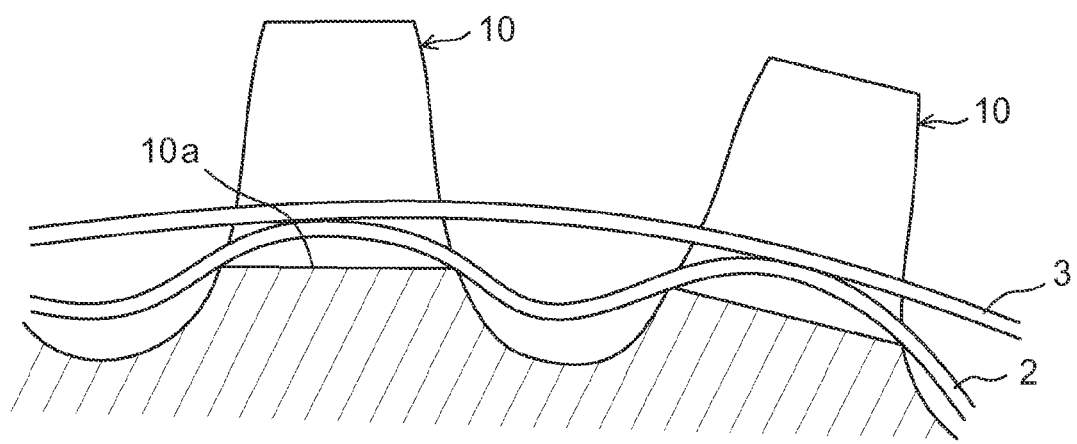
FIG. 3 An enlarged partial cutaway view of FIG. 1.

As shown in FIG. 2, the first cushion ring 2 consists of a single wire and has a wave-like shape comprising a plurality of projections (convex curved parts) 2a arranged at intervals. Depressions (concave curved parts) 2b are formed between the adjacent projections 2a in the circumferential direction. The projections 2a are provided in positions corresponding to the teeth 10 of the sprocket 1.

The second cushion ring 3 likewise consists of a single wire and has a circular shape miming around the outer circumference of the sprocket. In this instance, the second cushion ring 3 is circumscribed about the first cushion ring 2, and the second cushion ring 3 is provided in such a way as to be able to slide against the projections 2a on the first cushion ring 2.

The first and second cushion rings 2, 3 are made of metal, preferably steel. To be more specific, the first and second cushion rings 2, 3 are made of spring steel or stainless steel, or similar.

A starting end 20 and terminal end 21 of the first cushion ring 2 are fixedly joined by butt welding, for example, as shown in FIG. 5(a). A starting end 30 and terminal end 31 of the second cushion ring 3 are likewise fixedly joined by butt welding, for example, as shown in FIG. 6(a).

The behavior of the cushioning structure when the roller chain meshes with the sprocket 1 will be described next with the aid of FIG. 7.

Figure 7:
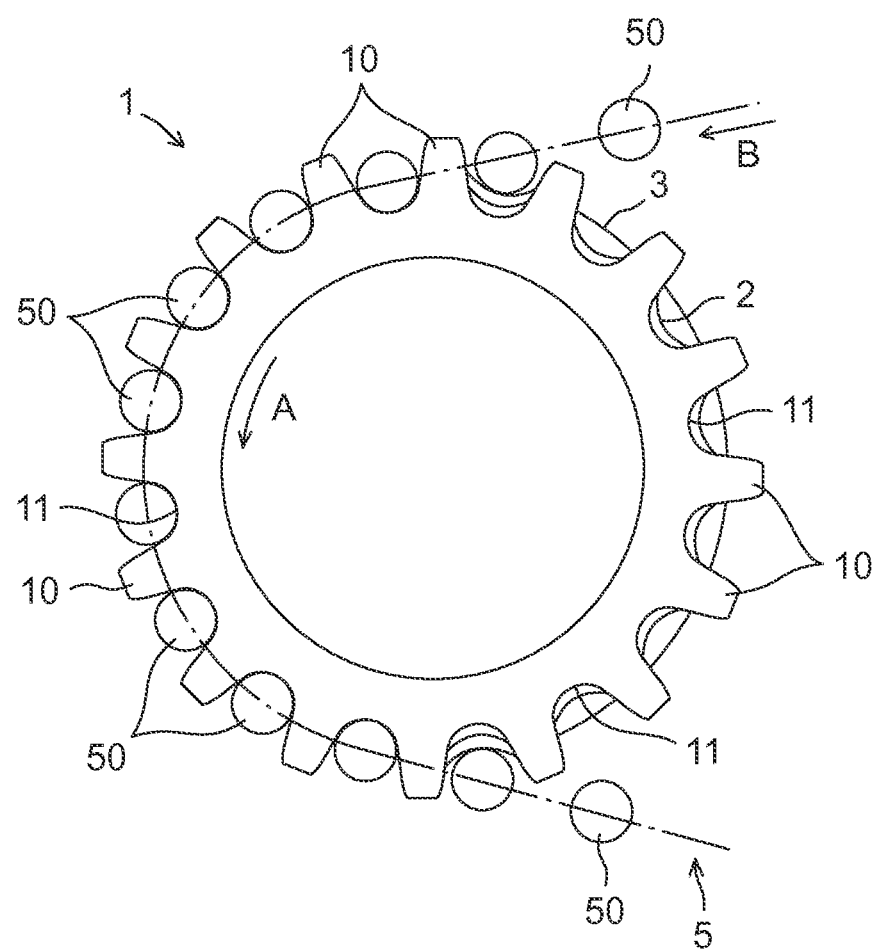
FIG. 7 A view showing the situation when the above sprocket (FIG. 1) meshes with a roller chain or bush chain.

It should be noted that in FIG. 7, the reference symbol 5 schematically denotes the roller chain and the reference symbol 50 denotes rollers of the roller chain 5. Furthermore, the arrow A indicates the direction of rotation of the sprocket 1 and the arrow B indicates the direction of travel of the roller chain 5.

When the sprocket 1 meshes with the rollers 50 of the roller chain 5, the rollers 50 of the roller chain 5 make contact with the second cushion ring 3, which is provided on the outer circumferential side of the cushioning structure, at the tooth bottom parts 11 of the sprocket 1. When this happens, the second cushion ring 3 elastically deforms toward the tooth bottom parts 11 side, and as a result the first cushion ring 2, which is provided on the inner circumferential side of the cushioning structure, also elastically deforms toward the tooth bottom part 11 side, and the rollers 50 engage with the tooth bottom parts 11. At this point, the first and second cushion rings 2, 3 are held between the rollers 50 and the tooth bottom parts 11.

In this case, when the rollers 50 mesh with the sprocket, the rollers 50 are first of all elastically supported by the second cushion ring 3, and then they are also elastically supported by the first cushion ring 2 (and therefore by both the first and second cushion rings 2, 3). That is, the elastic support of the rollers 50 here is achieved in two stages, in other words, the impact energy received from the rollers 50 is consumed in stages by the two-stage elastic deformation of the first and second cushion rings 2, 3, and therefore it is possible to effectively reduce the impact noise produced by the impact of the rollers 50 with the bottom tooth parts 11 of the sprocket 1.

Furthermore, the second cushion ring 3 in the cushioning structure is circumscribed about the projections 2a of the first cushion ring 2, and therefore the first and second cushion rings 2, 3 slide against each other when the second cushion ring 3 undergoes elastic deformation. That is, in this case, the impact energy received from the rollers 50 is consumed by the frictional heat produced by the sliding of the first and second cushion rings 2, 3, and therefore it is possible to effectively reduce the impact noise produced by the impact of the rollers 50 with the bottom tooth parts 11 of the sprocket 1.

As described above, when the rollers 50 of the roller chain 5 mesh with the sprocket, the first and second cushion rings 2, 3 undergo elastic deformation, while at the same time the first and second cushion rings 2, 3 slide against each other, and therefore this synergistic effect makes it possible to effectively reduce the impact noise produced by the impact of the rollers 50 with the bottom tooth parts 11 of the sprocket teeth 10, and as a result it is possible to reduce the operating noise.

Moreover, in this case, the first and second cushion rings 2, 3 are both made of wire, and therefore they are not easily worn by either the impact from the rollers 50, or by the sliding therebetween, and as a result the operating durability can be further improved.

It should be noted that the first exemplary embodiment describes an example in which the starting end 20 and the terminal end 21 of the first cushion ring 2 are fixed together and the starting end 30 and the terminal end 31 of the second cushion ring 3 are also fixed together, but as shown in FIG. 5(b), the starting end 20 and the terminal end 21 of the first cushion ring 2 may be provided in an overlapping state in such a way as to be able to slide against each other. As shown in FIG. 6(b), the starting end 30 and the terminal end 31 of the second cushion ring 3 may likewise be provided in an overlapping state in such a way as to be able to slide against each other.

In this case, when the first cushion ring 2 elastically deforms due to the impact of the rollers 50, the starting end 20 and the terminal end 21 of the first cushion ring 2 are able to slide against each other, and therefore the impact energy received from the rollers 50 can also be consumed by the frictional heat produced by the sliding between the starting end 20 and the terminal end 21, and as a result it is possible to even more effectively reduce the impact noise produced by the impact of the rollers 50 with the bottom tooth parts 11 of the sprocket 1.

In the same way, when the second cushion ring 3 elastically deforms due to the impact of the rollers 50, the starting end 30 and the terminal end 31 of the second cushion ring 3 are able to slide against each other, and therefore the impact energy received from the rollers 50 can also be consumed by the frictional heat produced by the sliding between the starting end 30 and the terminal end 31, and as a result it is possible to even more effectively reduce the impact noise produced by the impact of the rollers 50 with the bottom tooth parts 11 of the sprocket 1.

Second Exemplary Embodiment

FIGS. 8 through 12 illustrate the cushioning structure according to the second exemplary embodiment of the present invention; in the figures, the same reference symbols as in the first exemplary embodiment described above denote like or equivalent elements.

Figure 8:
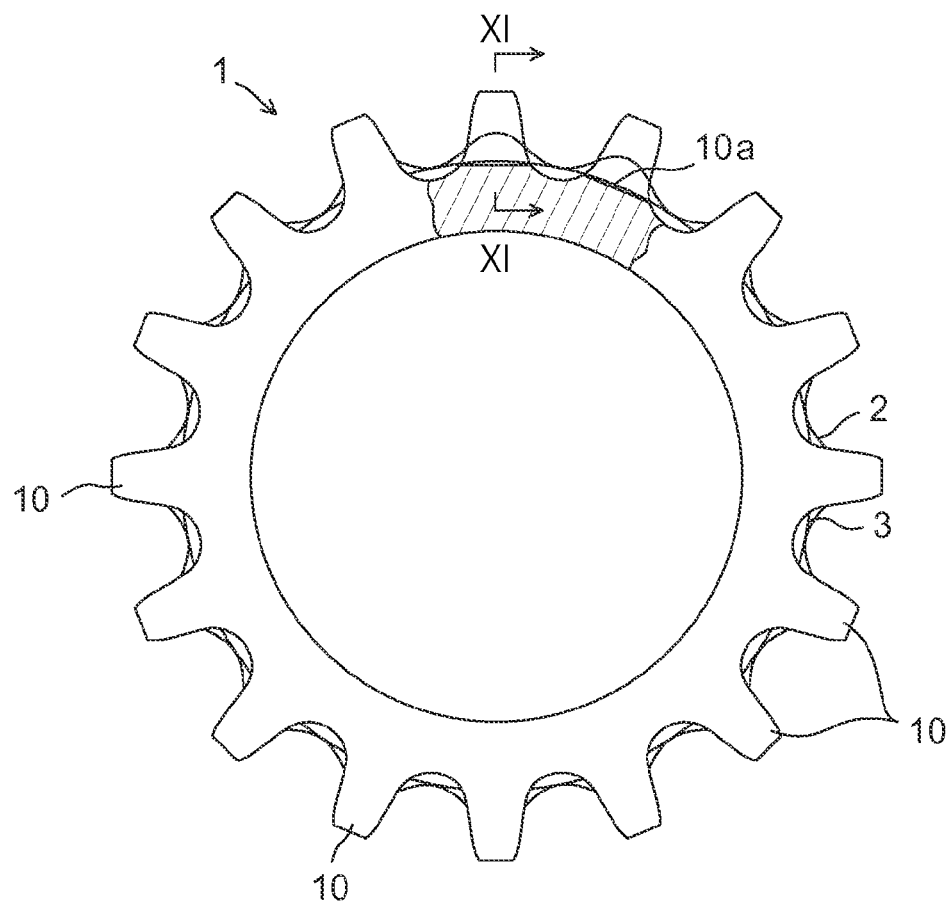
FIG. 8 A partial cutaway front view of a sprocket provided with the cushioning structure according to a second exemplary embodiment of the present invention.

As shown in FIG. 8, a sprocket 1 for a roller chain or bush chain comprises a plurality of teeth 10 arranged around the outer circumference thereof. Arcuate tooth bottom parts 11 with which the rollers of the roller chain or bushes of the bush chain engage are formed between the adjacent teeth 10 in the circumferential direction.

Figure 11:
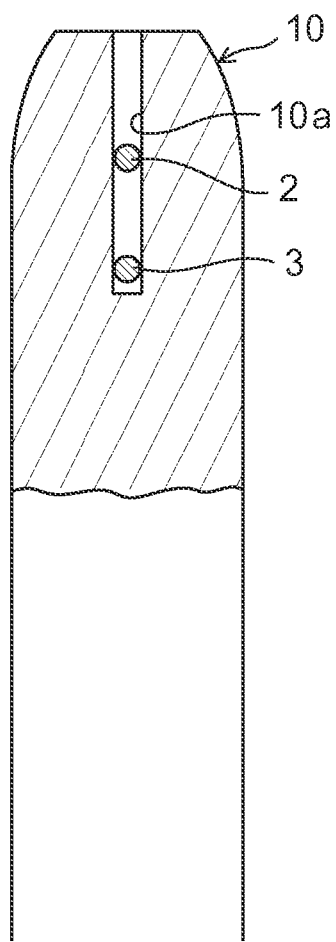
FIG. 11 A view in cross section along the line XI-XI in FIG. 8.

Grooves 10a are formed in the circumferential direction at the tooth surface of each tooth 10. As shown in FIG. 11 which is a view in cross section along the line XI-XI in FIG. 8, the grooves 10a are slit-like grooves cut into the tooth parts from the tooth tip toward the center of the sprocket substantially in the center in the tooth thickness direction (the left-right direction in FIG. 11).

A first cushion ring 2 and a second cushion ring 3 which form the cushioning structure according to the second exemplary embodiment of the present invention are provided within the grooves 10a. The first cushion ring 2 is provided at the outer side (i.e. the outer circumferential side) of the second cushion ring 3. The first and second cushion rings 2, 3 are both annular members which are provided along the grooves 10a (see FIG. 10).

Figure 9:
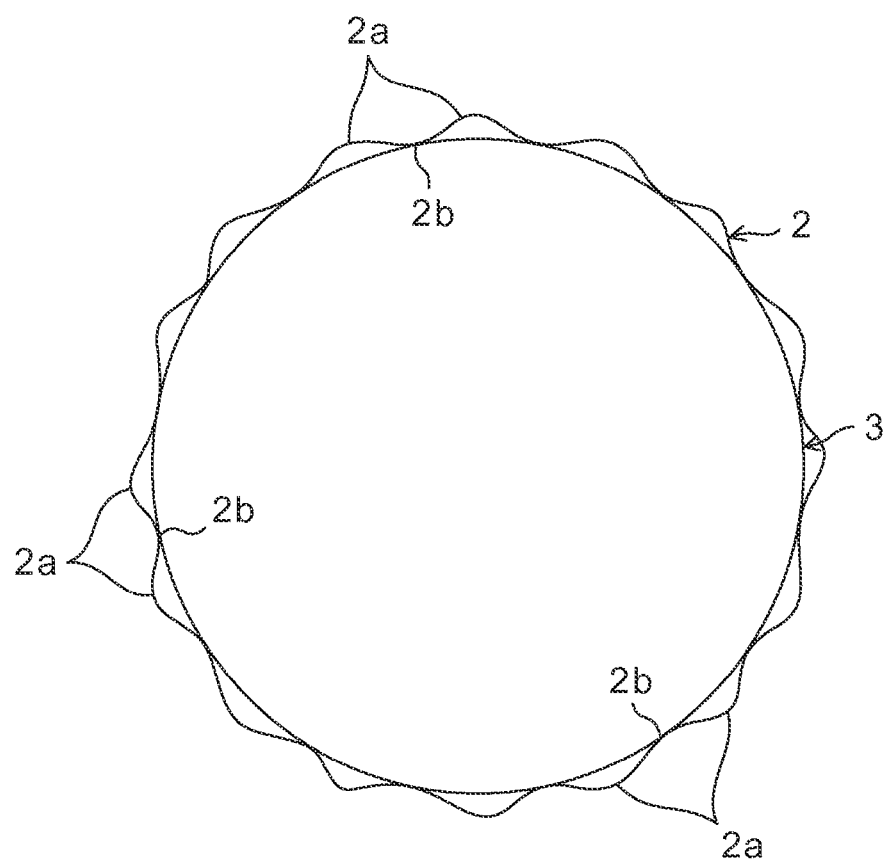
FIG. 9 A front view of the above cushioning structure (FIG. 8).
Figure 10:
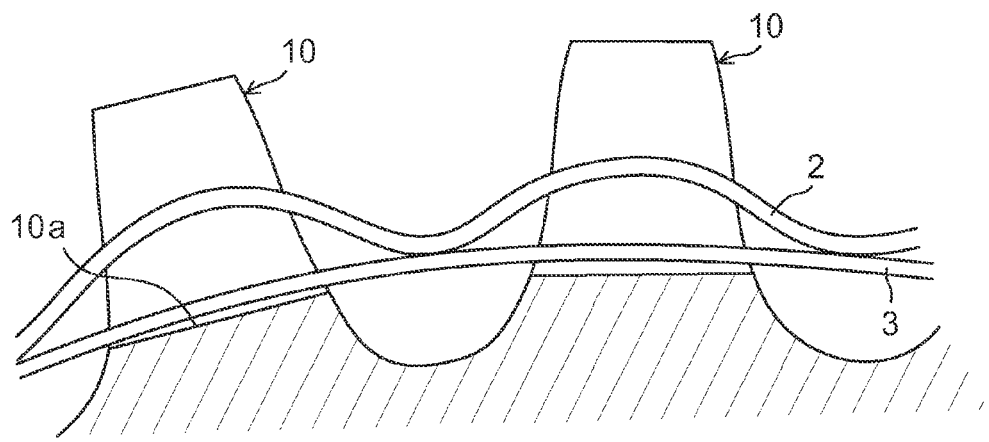
FIG. 10 An enlarged partial cutaway view of FIG. 8.

As shown in FIG. 9, the first cushion ring 2 consists of a single wire and has a wave-like shape comprising a plurality of projections (convex curved parts) 2a arranged at intervals. Depressions (concave curved parts) 2b are formed between the adjacent projections 2a in the circumferential direction. The projections 2a are provided in positions corresponding to the teeth 10 of the sprocket 1.

The second cushion ring 3 likewise consists of a single wire and has a circular shape running around the outer circumference of the sprocket. In this instance, the second cushion ring 3 is inscribed within the first cushion ring 2, and the second cushion ring 3 is provided in such a way as to be able to slide against the depressions 2b between the adjacent projections 2a in the circumferential direction of the first cushion ring 2.

The first and second cushion rings 2, 3 are made of metal, preferably steel. To be more specific, the first and second cushion rings 2, 3 are made of spring steel or stainless steel, or similar.

A starting end 20 and terminal end 21 of the first cushion ring 2 are fixedly joined by butt welding, for example, as shown in FIG. 5(a) of the first exemplary embodiment. A starting end 30 and terminal end 31 of the second cushion ring 3 are likewise fixedly joined by butt welding, for example, as shown in FIG. 6(a) of the first exemplary embodiment.

The behavior of the cushioning structure when the roller chain meshes with the sprocket 1 will be described next with the aid of FIG. 12.

Figure 12:
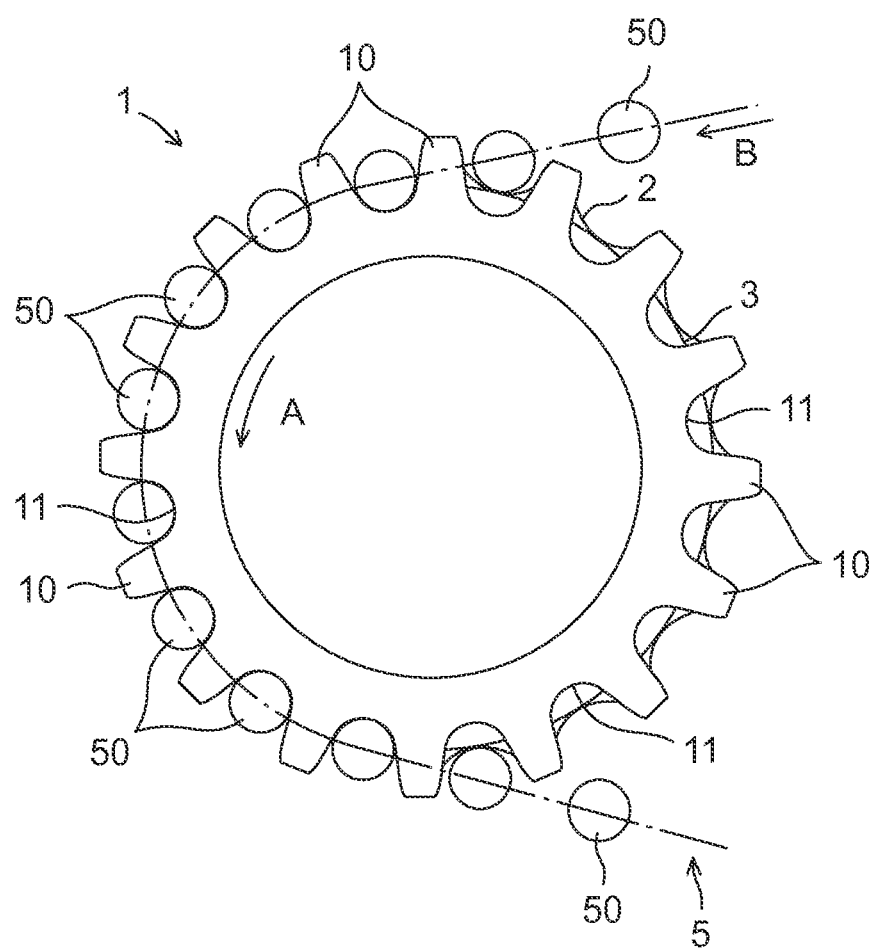
FIG. 12 A view showing the situation when the above sprocket (FIG. 8) meshes with a roller chain or bush chain.

It should be noted that in FIG. 12, the reference symbol 5 schematically denotes the roller chain and the reference symbol 50 denotes rollers of the roller chain 5. Furthermore, the arrow A indicates the direction of rotation of the sprocket 1 and the arrow B indicates the direction of travel of the roller chain 5.

When the sprocket 1 meshes with the rollers 50 of the roller chain 5, the rollers 50 of the roller chain 5 make contact with the first cushion ring 2, which is provided on the outer circumferential side of the cushioning structure, at the tooth bottom parts 11 of the sprocket 1. When this happens, the first cushion ring 2 elastically deforms toward the tooth bottom parts 11 side, and as a result the second cushion ring 3, which is provided on the inner circumferential side of the cushioning structure, also elastically deforms toward the tooth bottom part 11 side, and the rollers 50 engage with the tooth bottom parts 11. At this point, the first and second cushion rings 2, 3 are held between the rollers 50 and the tooth bottom parts 11.

In this case, when the rollers 50 mesh with the sprocket, the rollers 50 are first of all elastically supported by the first cushion ring 2, and then they are also elastically supported by the second cushion ring 3 (and therefore by both the first and second cushion rings 2, 3). That is, the elastic support of the rollers 50 here is achieved in two stages, in other words, the impact energy received from the rollers 50 is consumed in stages by the two-stage elastic deformation of the first and second cushion rings 2, 3, and therefore it is possible to effectively reduce the impact noise produced by the impact of the rollers 50 with the bottom tooth parts 11 of the sprocket 1.

Furthermore, the second cushion ring 3 in the cushioning structure is inscribed within the depressions 2b of the first cushion ring 2, and therefore the first and second cushion rings 2, 3 slide against each other when the first cushion ring 2 undergoes elastic deformation. That is, in this case, the impact energy received from the rollers 50 is consumed by the frictional heat produced by the sliding of the first and second cushion rings 2, 3, and therefore it is possible to effectively reduce the impact noise produced by the impact of the rollers 50 with the bottom tooth parts 11 of the sprocket 1.

As described above, when the rollers 50 of the roller chain 5 mesh with the sprocket, the first and second cushion rings 2, 3 undergo elastic deformation, while at the same time the first and second cushion rings 2, 3 slide against each other, and therefore this synergistic effect makes it possible to effectively reduce the impact noise produced by the impact of the rollers 50 with the bottom tooth parts 11 of the sprocket teeth 10, and as a result it is possible to reduce the operating noise.

Moreover, in this case, the first and second cushion rings 2, 3 are both made of wire, and therefore they are not easily worn by either the impact from the rollers 50, or by the sliding therebetween, and as a result the operating durability can be further improved.

It should be noted that the second exemplary embodiment describes an example in which the starting end 20 and the terminal end 21 of the first cushion ring 2 are fixed together and the starting end 30 and the terminal end 31 of the second cushion ring 3 are also fixed together, but as shown in FIG. 5(b) of the first exemplary embodiment, the starting end 20 and the terminal end 21 of the first cushion ring 2 may be provided in an overlapping state in such a way as to be able to slide against each other. As shown in FIG. 6(b) of the first exemplary embodiment, the starting end 30 and the terminal end 31 of the second cushion ring 3 may likewise be provided in an overlapping state in such a way as to be able to slide against each other.

In this case, when the first cushion ring 2 elastically deforms due to the impact of the rollers 50, the starting end 20 and the terminal end 21 of the first cushion ring 2 are able to slide against each other, and therefore the impact energy received from the rollers 50 can also be consumed by the frictional heat produced by the sliding between the starting end 20 and the terminal end 21, and as a result it is possible to even more effectively reduce the impact noise produced by the impact of the rollers 50 with the bottom tooth parts 11 of the sprocket 1.

In the same way, when the second cushion ring 3 elastically deforms due to the impact of the rollers 50, the starting end 30 and the terminal end 31 of the second cushion ring 3 are able to slide against each other, and therefore the impact energy received from the rollers 50 can also be consumed by the frictional heat produced by the sliding between the starting end 30 and the terminal end 31, and as a result it is possible to even more effectively reduce the impact noise produced by the impact of the rollers 50 with the bottom tooth parts 11 of the sprocket 1.

The first and second exemplary embodiments described examples in which the sprocket meshes with a roller chain, but the present invention may be applied in the same way to a case in which the sprocket meshes with a bush chain. In this case, the reference symbol 50 denotes the bushes of a bush chain in FIGS. 7 and 12.

Third Exemplary Embodiment

Figure 13:
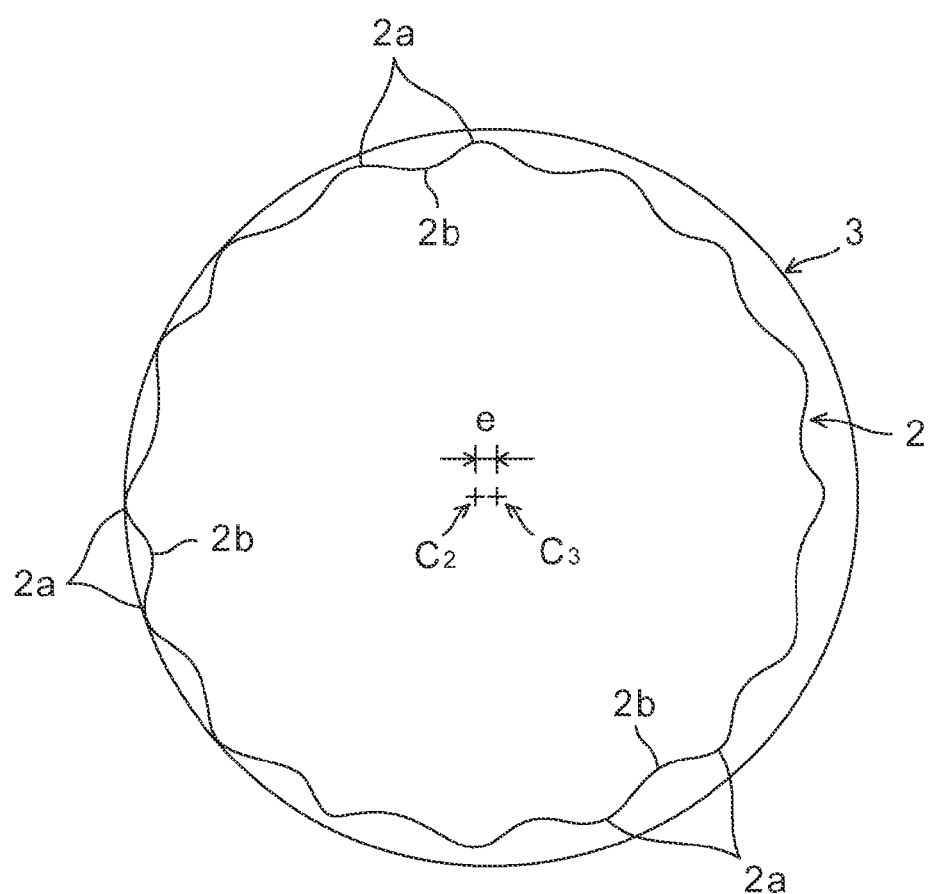
FIG. 13 A partial cutaway front view of a sprocket provided with the cushioning structure according to a third exemplary embodiment of the present invention.

In the example described in the first exemplary embodiment, the first and second cushion rings 2, 3 were concentrically arranged, as shown in FIG. 2, but the present invention is not limited to this application. FIG. 13 shows the cushioning structure according to a third exemplary embodiment of the present invention. In FIG. 13, the same reference symbols as in the first exemplary embodiment described above denote like or equivalent elements.

As shown in FIG. 13, in the third exemplary embodiment, the inner diameter of the second cushion ring 3 is greater than the outer diameter of the first cushion ring 2. That is, if $C_2$ is the center of the first cushion ring 2 and $C_3$ is the center of the second cushion ring 3, then the centre $C_3$ is offset from the center $C_2$ by e.

In this case, the inner diameter of the second cushion ring 3 is greater than the outer diameter of the first cushion ring 2, and the second cushion ring 3 is eccentric with respect to the first cushion ring 2, which means that when the roller chain or bush chain meshes with the sprocket and the second cushion ring 3 elastically deforms, the contacted portions of the second cushion ring 3 which are contacted by the rollers of the roller chain or bushes of the bush chain not only undergo localized elastic deformation, but the whole of the second cushion ring 3 also elastically deforms in an elliptical shape. This synergistic effect not only makes it possible to effectively reduce the impact noise, but also to reduce localized wear on the second cushion ring 3 and improve the durability.

Fourth Exemplary Embodiment

Figure 14:
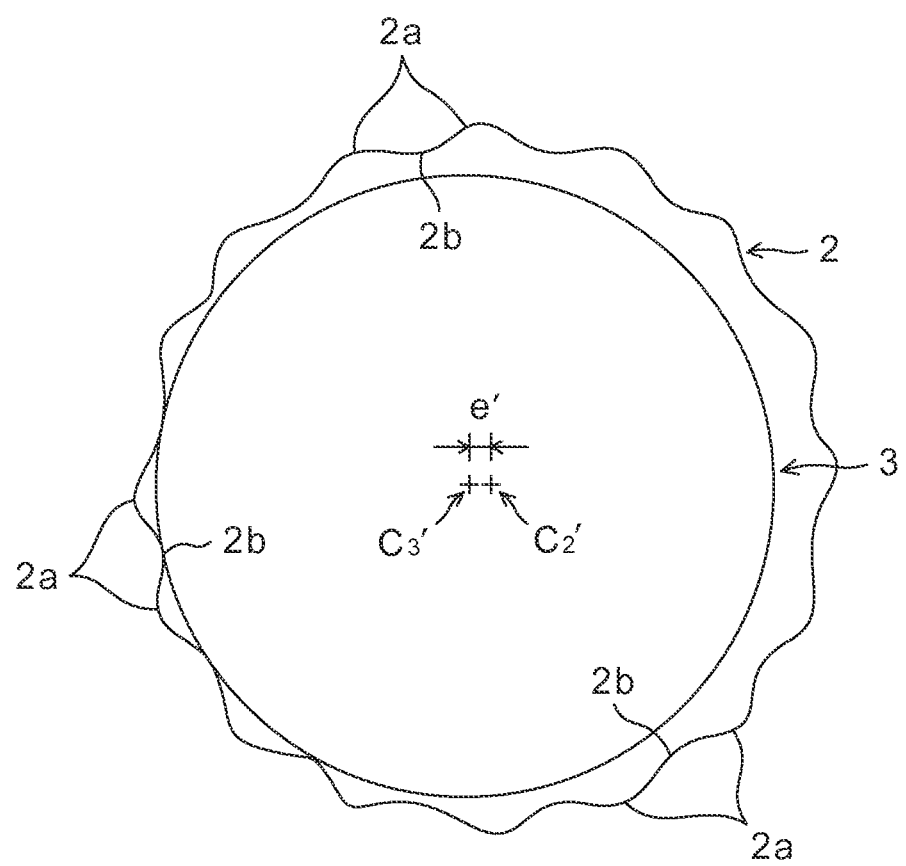
FIG. 14 A partial cutaway front view of a sprocket provided with the cushioning structure according to a fourth exemplary embodiment of the present invention.

In the example described in the second exemplary embodiment, the first and second cushion rings 2, 3 were concentrically arranged, as shown in FIG. 9, but the present invention is not limited to this application. FIG. 14 shows the cushioning structure according to a fourth exemplary embodiment of the present invention. In FIG. 14, the same reference symbols as in the second exemplary embodiment described above denote like or equivalent elements.

As shown in FIG. 14, in the fourth exemplary embodiment, the inner diameter of the first cushion ring 2 is greater than the outer diameter of the second cushion ring 3. That is, if $C_3'$ is the center of the second cushion ring 3 and $C_2'$ is the center of the first cushion ring 2, then the centre $C_2'$ is offset from the center $C_3'$ by e'.

In this case, the inner diameter of the first cushion ring 2 is greater than the outer diameter of the second cushion ring 3, and the first cushion ring 2 is eccentric with respect to the second cushion ring 3, which means that when the roller chain or bush chain meshes with the sprocket and the first cushion ring 2 elastically deforms, the contacted portions of the first cushion ring 2 which are contacted by the rollers of the roller chain or bushes of the bush chain not only undergo localized elastic deformation, the whole of the first cushion ring 2 also elastically deforms in an elliptical shape. This synergistic effect not only makes it possible to effectively reduce the impact noise, but also to reduce localized wear on the first cushion ring 2 and improve the durability.

FIELD OF INDUSTRIAL APPLICATION

The present invention is suitable for a sprocket for a roller chain or a bush chain, and it is particularly suitable where there is a need for reduced operating noise and improved durability.

KEY TO SYMBOLS

1: sprocket
10: tooth
10a: groove
11: tooth bottom part
2: first cushion ring
2a: projection
2b: depression
20: starting end
21: terminal end
3: second cushion ring
30: starting end
31: terminal end
5: roller chain
50: roller
$C_2$, $C_2'$: center of first cushion ring
$C_3$, $C_3'$: center of second cushion ring

PRIOR ART DOCUMENTS

Patent Documents

Patent Document 1 JP52-163661U (see FIG. 1)
Patent Document 2 JP57-137856U (see FIGS. 1 through 4)

The invention claimed is:

1. A cushioning structure for a sprocket used in a roller chain or a bush chain, wherein the sprocket comprises a plurality of teeth arranged around the outer circumference thereof, and grooves which are formed in the circumferential direction at the tooth surface of each tooth;
the cushioning structure comprises first and second annular cushion rings respectively provided along the grooves;
the first cushion ring consists of a single wire and has a wave-like shape comprising a plurality of projections arranged at intervals;
the second cushion ring consists of a single wire and has a circular shape running around the outer circumference of the sprocket; and
the first and second cushion rings are provided in such a way as to be able to slide against each other.

2. The cushioning structure as claimed in claim 1, wherein the starting end and the terminal end of the first cushion ring are joined.

3. The cushioning structure as claimed in claim 1, wherein the starting end and the terminal end of the first cushion ring are not joined and overlap in such a way as to be able to slide against each other.

4. The cushioning structure as claimed in claim 1, wherein the starting end and the terminal end of the second cushion ring are joined.

5. The cushioning structure as claimed in claim 1, wherein the starting end and the terminal end of the second cushion ring are not joined and overlap in such a way as to be able to slide against each other.

6. The cushioning structure as claimed in claim 1, wherein the projections of the first cushion ring are provided correspondingly with the teeth of the sprocket.

7. The cushioning structure as claimed in claim 1, wherein the first cushion ring is provided at the inner side of the second cushion ring.

8. The cushioning structure as claimed in claim 7, wherein the second cushion ring is circumscribed about the projections of the first cushion ring.

9. The cushioning structure as claimed in claim 7, wherein the inner diameter of the second cushion ring is greater than the outer diameter of the first cushion ring, and the center of the second cushion ring is offset from the center of the first cushion ring.

10. The cushioning structure as claimed in claim 1, wherein the first cushion ring is provided at the outer side of the second cushion ring.

11. The cushioning structure as claimed in claim 10, wherein the second cushion ring is inscribed within the depressions formed between the adjacent projections of the first cushion ring.

12. The cushioning structure as claimed in claim 10, wherein the inner diameter of the first cushion ring is greater than the outer diameter of the second cushion ring, and the center of the first cushion ring is offset from the center of the second cushion ring.

13. The cushioning structure as claimed in claim 1, wherein the first and second cushion rings are made of steel.

14. A cushioning structure for a sprocket (1) used in a roller chain (5) or a bush chain, wherein the sprocket (1) comprises a plurality of teeth (10) arranged around the outer circumference thereof, and grooves (10a) which are formed in the circumferential direction at the tooth surface of each tooth (10);
the cushioning structure comprises first and second annular cushion rings (2, 3) respectively provided along the grooves (10a);
the first cushion ring (2) consists of a single wire and has a wave-like shape comprising a plurality of projections (2a) arranged at intervals;
the second cushion ring (3) consists of a single wire and has a circular shape running around the outer circumference of the sprocket (1);
the first and second cushion rings (2, 3) are provided in such a way as to be able to slide against each other; and
when rollers (50) of the roller chain (5) or bushes of the bush chain mesh with the sprocket (1), the rollers (50) or the bushes make contact with the first or second cushion ring (2, 3) causing the first or second cushion ring (2, 3) to elastically deform, then causing the second or first cushion ring (3, 2) to elastically deform, at which point the first and second cushion rings (2, 3) slide against each other, whereby the impact noise of the rollers (50) or bushes and the sprocket teeth (10) is reduced.

* * * * *